ent Office 3,772,299
Patented Nov. 13, 1973

3,772,299
p'-ALKOXY-ERGOTAMINES
Paul Stadler, Biel-Benken, and Peter Stütz, Basel, Switzerland, assignors to Sandoz Ltd. (also known as Sandoz AG), Basel, Switzerland
No Drawing. Filed May 25, 1971, Ser. No. 146,829
Claims priority, application Switzerland, May 26, 1970, 7,793/70
Int. Cl. C07d 51/64
U.S. Cl. 260—268 PE                    2 Claims

ABSTRACT OF THE DISCLOSURE

The present invention concerns new compounds of the formula:

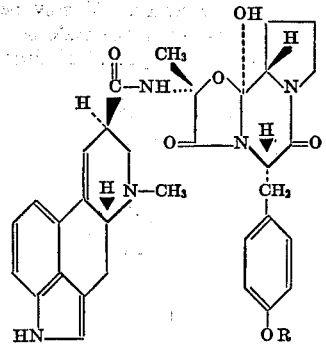

wherein R is lower alkyl of 1 to 4 carbon atoms, and their pharmaceutically acceptable acid addition salts.

The compounds and their pharmaceutically acceptable acid addition salts are useful in promoting uterus contractions. Furthermore, they are useful in the treatment of migraine type headaches and circulatory disorders.

---

The present invention relates to heterocyclic compounds and more specifically to ergot alkaloids.

The present invention provides new heterocyclic compounds of Formula I,

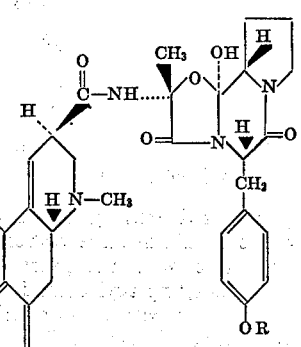

(I)

wherein R is lower alkyl of 1 to 4 carbon atoms, and acid addition salts thereof.

The present invention also provides a process for the production of a compound of Formula I or an acid addition salt thereof, which comprises reacting an acid addition salt of a compound of Formula II,

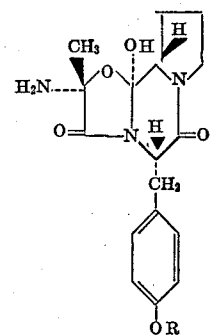

(II)

wherein R is as defined above, with a reactive functional derivative of a compound of Formula III,

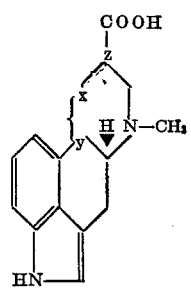

(III)

wherein

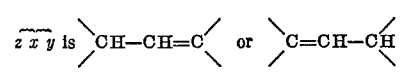

in an inert organic solvent or solvent mixture, in the presence of a basic condensation agent, preferably at a temperature of $-20°$ to $0°$ C., and, when required, converting the resulting compound into an acid addition salt.

A suitable reactive functional derivative of a compound of Formula III which may be used is the mixed anhydride with trifluoroacetic acid. This may be produced by reacting a compound of Formula III with trifluoroacetic acid anhydride in the presence of trifluoroacetic acid, in an inert organic solvent or solvent mixture, at a temperature of $-20°$ to $-10°$ C. An acid addition salt of a compound of Formula II in an inert organic solvent or solvent mixture is then added to the resulting mixed anhydride in the presence of a tertiary organic base, at a temperature of $-20°$ to $-10°$ C., and the reaction mixture is allowed to react for a short period at a temperature of about $-10°$ to $0°$ C.

It is possible to use other mixed anhydrides, e.g. with sulphuric acid, as reactive derivatives of compounds of Formula III. The acid chloride hydrochloride or the acid azide, or the addition product with the imidohalide of an N-di(lower)alkyl substituted carboxylic acid amide, e.g. dimethyl formamide or dimethyl acetamide, may likewise be used.

A preferred method of effecting the process comprises using as compound of Formula III a mixture of lysergic acid, isolysergic acid and 6-methyl-$\Delta^{8,9}$-ergolene-8-carboxylic acid, which mixture may, for example, be obtained by saprophytic cultivation of the fungus strain of the species *Claviceps paspali* Stevens and Hall. A culture of this strain has been deposited with the U.S. Department of Agriculture (Northern Utilization Research and Development Division), Peoria, Ill., U.S.A., under the reference NRRL 3080. There are no restrictions on the availability of this culture deposit to the public, and the culture will be maintained by the depositor throughout the effective life of a patent issued on the present application. The above mixture may be dried by heating to 150° C. in a vacuum and is preferably used in dry form. The compound of Formula II is added to the reaction mixture in the form of an acid addition salt thereof, whereby hydrochloric acid is conveniently used as acid addition salt-forming acid; however, other mineral acids may likewise be used.

For the production of the mixed anhydrides of compounds of Formula III with trifluoroacetic acid, the ratio of the starting materials is preferably chosen such that 1 to 1.4 mols of trifluoroacetic acid anhydride and 2 mols of trifluoroacetic acid are used, calculated on 1 mol of the compound or compounds of Formula III.

The basic condensation agent is preferably a tertiary organic base, e.g. pyridine or its homologs. The basic condensation agent is preferably used in excess.

Acetonitrile, dimethyl formamide, dimethyl acetamide, propionitrile, N-methylpyrrolidone, methylene chloride or mixtures thereof may, for example, be used as inert organic solvents or solvent mixtures. The order of addition of reagents for the production of the mixed anhydrides may be changed. Thus, for example, a compound of Formula III in anhydrous form may be suspended in one of the organic solvents mentioned above and dissolved by the addition of 1 to 5 mols, preferably approximately 2 mols of trifluoroacetic acid, whereupon 1.2 mols of trifluoroacetic acid anhydride are added, or these two reagents may be simultaneously added dropwise to a suspension of a compound of Formula III in an inert solvent.

Since the resulting mixed anhydrides of the compounds of Formula III with trifluoroacetic acid are unstable, they are directly used in the next reaction as solution. An acid addition salt of a compound of Formula II, e.g. the hydrochloride, is immediately added to this solution of the mixed anhydrides, a ratio of 1 mol of an acid addition salt of a compound of Formula II to 1.3 to 2 mols of the mixed anhydride of trifluoroacetic acid with the compounds of Formula III being preferably used. The base of Formula II is liberated by the addition of a basic condensation agent, preferably a tertiary organic base, in excess, preferably at —20° to —10° C., the compound of Formula II reacting spontaneously with the mixed anhydride of trifluoroacetic acid with the compounds of Formula III. If desired, the order of the addition of the base and the acid addition salt of the compound of Formula II may be reversed. The reaction concludes rapidly, but it is advantageous to keep the reaction mixture at a temperature ranging from —10° C. for a further 15 to 100 minutes.

An acid addition salt of a compound of Formula II may be produced by a process which comprises a compound of Formula IV,

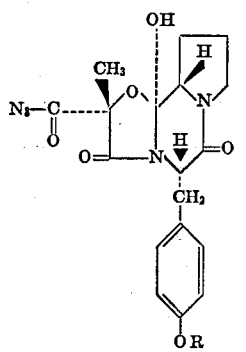

(IV)

wherein R is as defined above, with benzyl alcohol to obtain a compound of Formula V,

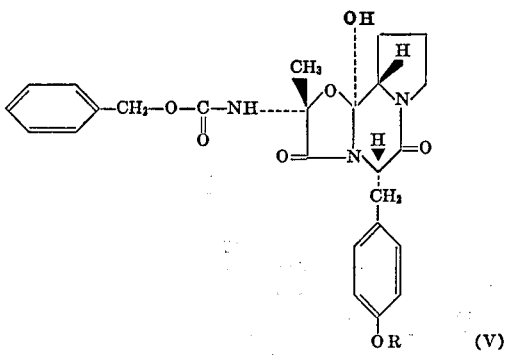

(V)

wherein R is as defined above,
and hydrogenolytically splitting off the benzyloxycarbonyl radical in acid solution.

The reaction of the compound of Formula IV with benzyl alcohol is preferably effected in an inert solvent, e.g. absolute chloroform, and under reflux.

The hydrogenolysis is conveniently effected over a palladium catalyst, e.g. a prehydrogenated palladium/charcoal catalyst, at room temperature and normal pressure.

The compounds of Formula IV may be produced by reacting S(+)-methyl-benzyloxy-malonic acid chloride monoethyl ester with a compound of Formula VI,

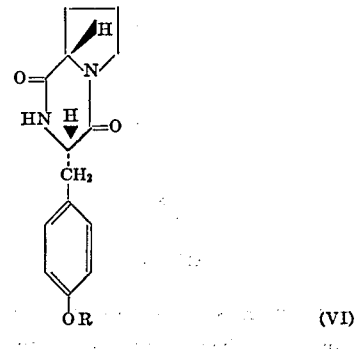

(VI)

wherein R is as defined above,
to obtain a compound of Formula VII.

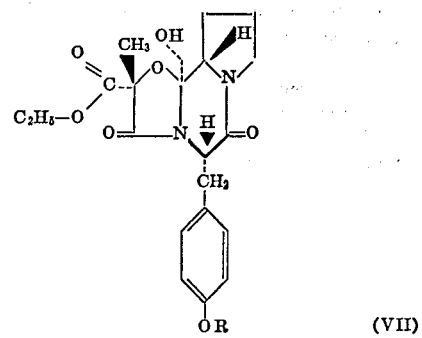

(VII)

wherein R is as defined above, saponifying the ethyl ester group of the compound of Formula VII to obtain the free carboxylic acid, reacting the carboxylic acid with phosphorus pentachloride to obtain the corresponding acyl chloride, and finally reacting the acyl chloride with sodium azide to obtain the acyl azide compound of Formula IV.

The Compounds I and pharmaceutically acceptable acid addition salts are useful because they possess pharmacological activity in animals. More particularly, the compounds are useful in promoting uterus contractions as indicated by the in situ test on the rabbit uterus. For this use, the dose to be administered will naturally vary depending on the compound employed, the mode of administration and the treatment desired. However, in general, satisfactory results are obtained at a daily dose of from about 0.01 milligram to about 0.2 milligram per kilogram animal body weight. For larger mammals, the daily dose is from about 0.5 to about 10 milligrams which may be administered in divided doses 2 to 3 times a day or in sustained release form. A dosage form suitable for oral administration contains from about 0.2 to about 5 milligrams of the compound, in admixture with pharmaceutical carriers or diluents.

The Compounds I and pharmaceutically acceptable acid addition salts thereof are also useful in the treatment of migraine type headaches as indicated by serotonin antagonistic properties shown in the in vitro test on the rat uterus and the edema test on the rat paw, and the vasoconstrictive properties shown in blood pressure tests on the spinal cat and dog. The compounds are furthermore useful in the treatment of circulatory disorders as indicated in the carotid sinus release reflex and the pressoric reflex tests in the cat. For these uses, the dosage will vary depending on the various factors already mentioned, and in general, satisfactory results are obtained at much the same dosage levels as indicated above.

The new compounds may be used as medicaments on their own or included in pharmaceutical compositions in forms appropriate for oral, enteral or parenteral administration. In order to produce suitable pharmaceutical compositions, the compounds are worked up with pharmaceutical carriers or diluents.

In the following non-limitative example all temperatures are indicated in degrees centigrade and are uncorrected.

Insofar as the production of the starting materials is not particularly described, these are known or may be obtained in a manner analogous to the production methods for the starting materials indicated in the example.

EXAMPLE p′-Methoxy-ergotamine 2.68 g. (10 millimols) of an anhydrous mixture of 40% d-lysergic acid, 40% 6-methyl-Δ$^{8,9}$-ergolene-8-carboxylic acid and 20% isolysergic acid are dissolved in 25 cc. of absolute dimethyl formamide by the addition of 2.28 g. (20 millimols) of trifluoroacetic acid, and the solution is brought to a temperature of −10° while stirring. A mixture of 2.52 g. (12 millimols) of trifluoroacetic acid anhydride in 12 cc. of absolute acetonitrile is added dropwise at this temperature within 5 minutes, and the clear solution is stirred for a further 10 minutes. 12 cc. of pyridine and 1.98 g. (5 millimols) of (2R,5S,10aS,10bS)-2 - methyl - 2 - amino - 5 - (p-methoxy)benzyl-3,6-dioxo-10b - hydroxy - octahydro - 8H - oxazolo[3,2 - a]pyrrolo[2,1-c]pyrazine hydrochloride are subsequently added with strong cooling and the reaction mixture is stirred for a further hour at a temperature between −10° and 0°.

Working up is effected by diluting with 200 cc. of methylene chloride and shaking thoroughly with 100 cc. of a 2 N sodium carbonate solution. The aqueous phase is again extracted thrice with 100 cc. amounts of methylene chloride. The combined organic phases are dried over sodium sulphate and concentrated by evaporation in a vacuum. The residue is chromatographed on a 50-fold quantity of aluminum oxide, activity II, whereby elution with 0.2% of methanol in methylene chloride yields pure p′-methoxy-ergotaminine which crystallizes from methylene chloride/isopropyl ether. M.P. 190–192° (decomp.), [α]$_D^{20}$=+321° (c.=1, methylene chloride/methanol 1:1).

Elution with 0.6% of methanol in methylene chloride first yields mixed fractions and then pure p′-methoxy-ergotamine which crystallizes from benzene. M.P. 168–170° (decomp.), [α]$_D^{20}$=−130° (c.=1, chloroform).

Bitartrate: From absolute ethanol, M.P. 186–188° (decomp.), [α]$_D^{20}$=+45° (c.=1, methylene chloride/methanol 1:1).

The (2R,5S,10aS,10bS)-2-methyl-2-amino-5-(p-methoxy)benzyl - 3,6 - dioxo - 10b - hydroxy - octahydro - 8H - oxazolo[3,2-a]pyrrolo[2,1-c]pyrazine hydrochloride, used as starting material, may be produced as follows:

(a) (2R,5S,10aS,10bS)-2-methyl-2-ethoxycarbonyl-5-(p - methoxy)benzyl - 3,6 - dioxo - 10b - hydroxy - octahydro-8H-oxazolo[3,2-a]pyrrolo[2,1-c]pyrazine.—11.9 g. (44 millimols) of S(+)-methylbenzyloxy-malonic acid chloride monoethyl ester is added dropwise at an internal temperature of 70° within 5 minutes to a stirred suspension of 10.96 g. (40 millimols) of L-prolyl-L-(O-methyl) tyrosine lactam in 12.06 g. (120 millimols) of N-methylmorpholine, and the reaction mash is stirred at this temperature for a further hour. Working up is effected by diluting with 500 cc. of ether and shaking thoroughly twice with 50 cc. amounts of N hydrochloric acid and subsequently with 100 cc. of saturated sodium hydrogen carbonate solution. After drying over sodium sulphate and evaporating the solvent, the residue is hydrogenated in 200 cc. of ethanol over 10 g. of prehydrogenated palladium (10%) on active charcoal at 20–50° and normal pressure. Approximately 950 cc. of hydrogen are taken up. After filtration and concentration in a vacuum, pure cyclol-carboxylic acid ethyl ester, having a M.P. of 156–158°, crystallizes. The yield may be improved by diluting with isopropyl ether. pK=10.76 in 80% MCS. [α]$_D^{20}$=−23° (c.=1, pyridine).

(b) (2R,5S,10aS,10bS)-2-methyl-2-carboxy-5-(p-methoxy)benzyl - 3,6 - dioxo - 10b - hydroxy - octahydro - 8H - oxazolo[3,2-a]pyrrolo[2,1-c]pyrazine.—4.18 g. of (2R,5S, 10aS,10bS) - 2 - methyl - 2 - ethoxycarbonyl - 5 - (p - methoxy)benzyl - 3,6 - dioxo - 10b - hydroxy - octahydro - 8H-oxazolo[3,2-a]pyrrolo[2,1-c]pyrazine are dissolved in 15 cc. of N caustic soda solution and the solution is allowed to stand at room temperature for 2 hours. After cooling to 0°, 15 cc. of ice-cold 2 N hydrochloric acid are added, whereby the acid crystallizes as monohydrate. After drying over night at room temperature in a high vacuum, the pure cyclol-carboxylic acid is obtained; decomposition point 142–144°, pK=3.94 in 80% MCS, [α]$_D^{20}$=−8° (c.=1, pyridine).

(c) (2R,5S,10aS,10bS)-2-methyl-2-chloroformyl-5-(p-methoxy)benzyl - 3,6 - dioxo-10b-hydroxy-octahydro-8H-oxazolo[3,2-a]pyrrolo[2,1-c]pyrazine.—4.2 g. (20 millimols) of phosphorus pentachloride are dissolved while stirring in 200 cc. of absolute ether, and 4.08 g. (10 millimols) of (2R,5S,10aS,10bS)-2-methyl-2-carboxy-5-(p-methoxy)benzyl - 3,6 - dioxo-10b-hydroxy-octahydro-8H-oxazolo[3,2-a]pyrrolo[2,1-c]pyrazine monohydrate are added. After stirring for 4 hours at room temperature, the crystals which are extremely sensitive to humidity are filetred off and are immediately used for the next reaction.

(d) (2R,5S,10aS,10bS) - 2 - methyl-2-azidocarbonyl-5-(p-methoxy)benzyl - 3,6 - dioxo-10b-hydroxy - octahydro - 8H - oxazolo[3,2-a]pyrrolo[2,1-c]pyrazine.—4.09 g. (10 millimols) of (2R,5S,10aS,10bS)-2-methyl-2-chloroformyl-5-(p-methoxy)benzyl - 3,6 dioxo-10b-hydroxy-octahydro-8H-oxazolo[3,2-a]pyrrolo[2,1 - c]pyrazine are suspended in 100 cc. of absolute methylene chloride, and this is thoroughly shaken for 4 minutes with a solution cooled to 0° of 6.5 g. (0.1 mol) of sodium azide in 25 cc. of water. After adding 70 cc. of saturated potassium hydrogen carbonate solution, the mixture is shaken for about 1 minute. The organic phase is separated and the aqueous phase is again extracted twice with 100 cc. amounts of absolute methylene chloride. The combined organic extracts are dried over sodium sulphate and concentrated by evaporation at a bath temperature of 30°. The residue crystallizes from absolute ether. Deflagration occurs at about 115°.

(e) (2R,5S,10aS,10bS) - 2 - methyl-2-carbobenzoxy-amino - 5 - (p - methoxy)benzyl-3,6-dioxo-10b-hydroxy-octahydro - 8H - oxazolo[3,2-a]pyrrolo[2,1-c]pyrazine.— 4.15 g. (10 millimols) of (2R,5S,10aS,10bS)-2-methyl-2-azidocarbonyl-5-(p-methoxy)benzyl - 3,6 - dioxo-10b-hydroxy-octahydro - 8H - oxazolo[3,2-a]pyrrolo[2,1-c]pyrazine are dissolved in 70 cc. of absolute chloroform, 4 cc. of benzyl alcohol are added, and the mixture is boiled under reflux for 40 minutes. After distilling off the solvent, finally in a high vacuum at 100°, the residue crystallizes from ethyl acetate. The above mentioned compound is obtained in pure form after crystallization from acetone/isopropyl ether. M.P. 124–127°, $[\alpha]_D^{20} = +8.7°$ (c.=1, methylene chloride).

(f) (2R,5S,10aS,10bS) - 2 - methyl-2-amino-5-(p-methoxy)benzyl-3,6-dioxo - 10b - hydroxy-octahydro - 8H-oxazolo[3,2-a]pyrrolo[2,1 - c[pyrazine hydrochloride.— 4.95 g. (10 millimols) of (2R,5S,10aS,10bS)-2-methyl-2-carbobenzoxyamino - 5 - (p - methoxy)benzyl-3,6-dioxo-10b-hydroxyoctahydro - 8H - oxazolo[3,2-a]pyrrolo[2,1-c]pyrazine are hydrogenated in 45 cc. of absolute tetrahydrofuran in which 12 millimols of hydrogen chloride gas has been dissolved, over 3.5 g. of prehydrogenated palladium/charcoal catalyst (10% palladium) for 45 minutes at room temperature and normal pressure. After filtration the filtrate is discarded and the residue is repeatedly washed out in a mixture of methylene chloride/methanol 1:1. After concentrating the combined wash solutions by evaporation at room temperature, a sufficient amount of pure (2R,5S,10aS,10bS) - 2 - amino-5-(p-methoxy)benzyl-3,6 - dioxo-10b-hydroxy-octahydro - 8H - oxazolo[3,2-a]pyrrolo[2,1-c]pyrazine hydrochloride crystallizes from 1,2-dimethoxyethane in yellowish fine needles. Decomposition point 151–154°.

The nuclear magnetic resonance spectrum still shows traces of dimethoxyethane and methanol in the crystal.

What is claimed is:
1. A compound of the formula:

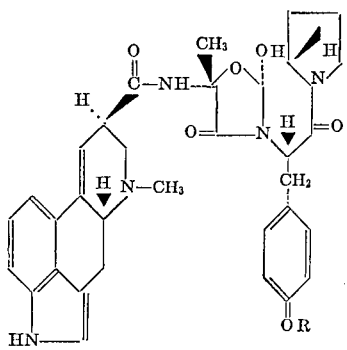

wherein R is lower alkyl of 1 to 4 carbon atoms, or a pharmaceutically acceptable acid addition salt thereof.
2. The compound of claim 1, which is p'-methoxyergotamine.

References Cited
UNITED STATES PATENTS

| | | | |
|---|---|---|---|
| 3,428,639 | 2/1969 | Stadler et al. | 260—268 |
| 3,585,201 | 6/1971 | Arlamone et al. | 260—268 PE |
| 3,586,683 | 6/1971 | Stadler et al. | 260—268 |

DONALD G. DAUS, Primary Examiner

U.S. Cl. X.R.

260—268 TR, 268 BC, 285.5; 424—261